Oct. 29, 1963     E. F. BUCKLEY     3,108,950
SEPARATOR APPARATUS
Filed Jan. 19, 1961     2 Sheets-Sheet 1
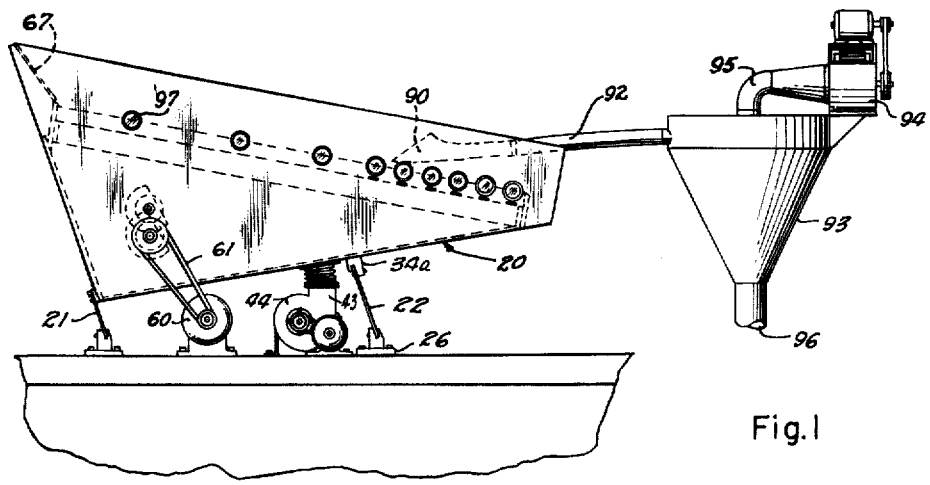
Fig. 1
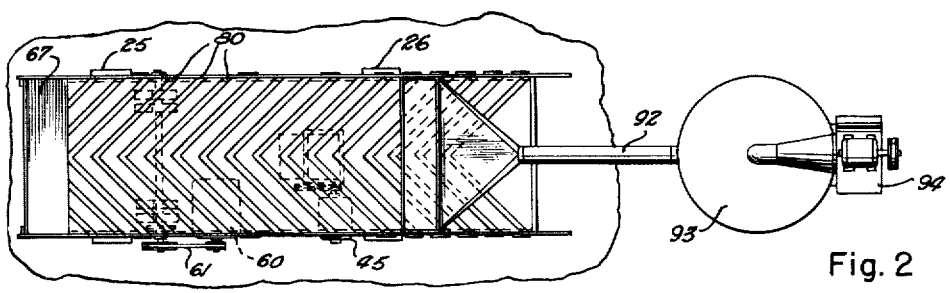
Fig. 2
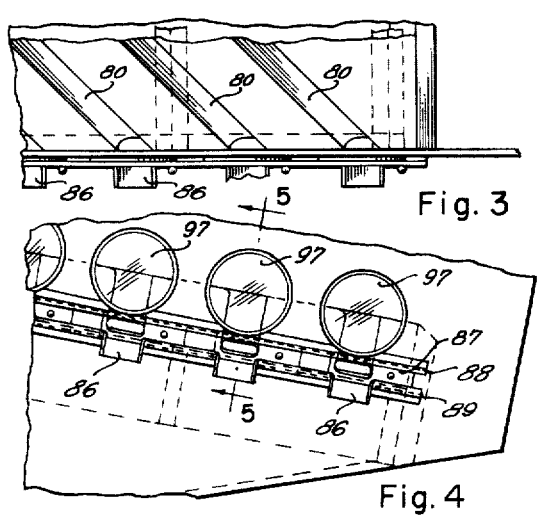
Fig. 3
Fig. 4
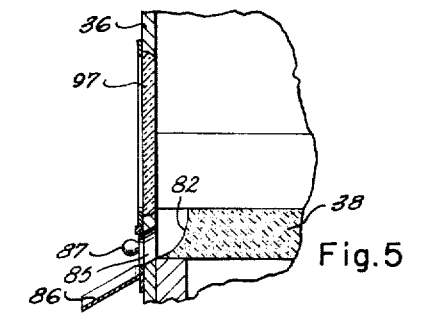
Fig. 5
INVENTOR
Eugene F. Buckley
BY
ATTORNEYS

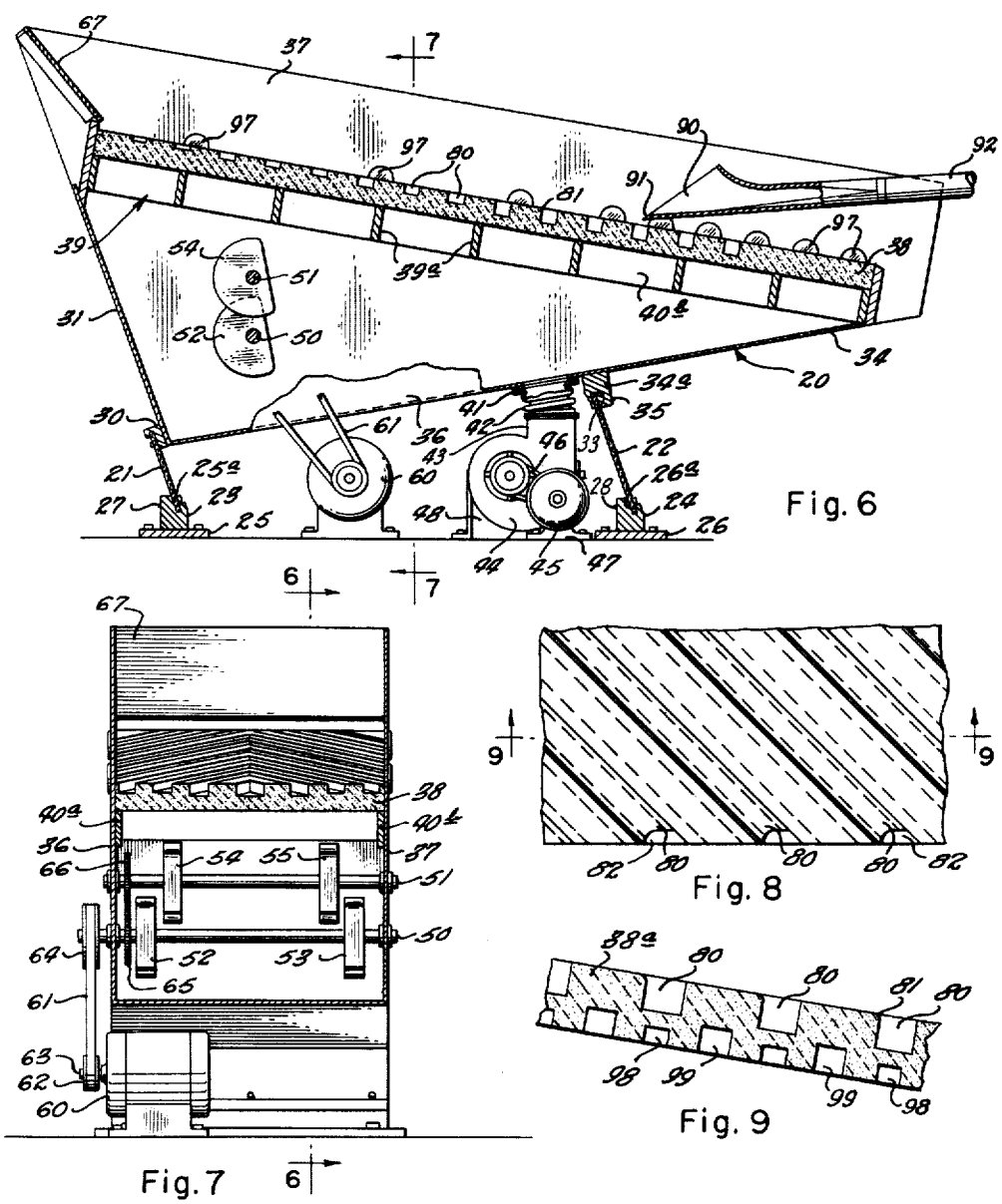
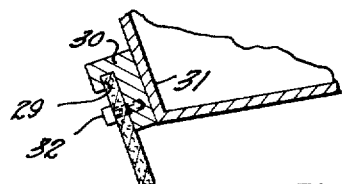

United States Patent Office 3,108,950
Patented Oct. 29, 1963

3,108,950
SEPARATOR APPARATUS
Eugene F. Buckley, 1420A E. 6th St., Irving, Tex.
Filed Jan. 19, 1961, Ser. No. 83,748
12 Claims. (Cl. 209—466)

This invention relates to a separator apparatus, and more particularly to a separator for separating dry materials.

An object of this invention is to provide a new and improved type of material separator apparatus wherein intermixed divided materials may be stratified and separated in accordance with their specific gravities.

Another object is to provide a new and improved separator for the dry extraction of precious metal particles from the rocks and sands in which they are carried. Still another object is to provide a separator having a porous deck with grooves in its upper surface, means for forcing air upwardly through the table, and means for vibrating the deck, whereby when a mixture of gangue and metal particles is deposited on the deck, the configuration of the grooves, the flow of air through the mixture, and the nature of the vibration will tend to cause metal particles to gravitate into the grooves.

Still another object is to provide a material separator machine incorporating a porous deck having an arrangement of grooves in one or both of its upper and lower surfaces whereby air forced upwardly through the porous deck will present a column of flowing air with variations in intensity of air flow along the length of the deck so that the mixture of materials deposited upon the deck and moving longitudinally thereacross will pass through zones of upwardly moving air of different velocity thereby to facilitate separating of particles of higher specific gravity from the mixture.

A further object is to provide visual control windows in a concentrating apparatus which comprises a separator trough having a porous deck or bed with surface grooves divergent outwardly to the sides of the deck, and means for forcing air upwardly through the deck and for vibrating the deck whereby fluidity will be imparted to a mixture of materials of various specific gravities deposited in the trough and the mixture will be conveyed as a loose blanket of particles across the porous deck with the particles of higher specific gravity settling or gravitating out to collect in the grooves of the deck, the windows being located in the sides of the trough to extend transversely across the extremities of the grooves at the sides of the porous deck so that the settling out process may be observed to aid in determining adjustments of the apparatus.

A still further object is to provide means for controlling the size of the discharge apertures in a concentrating apparatus for separating intermixed materials in accordance with their specific gravities which apparatus comprises a trough with a porous deck or bed having surface grooves leading to discharge apertures in the sides of the trough and means for forcing air upwardly through the deck and for vibrating the deck to cause the gravitation of particles of high specific gravity into the grooves whereby they are led to the discharge apertures, the dimensions of which may be adjusted by said means for controlling the size of the discharge apertures to control the outflow of concentrates from the grooves.

A still further object is to provide an improved concentrating apparatus useful for the dry extraction of precious metal particles from the sands in which they are carried which comprises a porous deck having grooves in its upper surface, means for forcing air upwardly through the table, and means for vibrating the deck, whereby when a mixture of gangue and metal particles is deposited on the deck the configuration of the grooves and the nature of the vibration will tend to impart a circular movement to the metal particles which have gravitated into the grooves thereby facilitating their collection and concentration within the grooves, and a vacuum scoop means for skimming the lighter specific gravity materials or gangue from the top of the mixture.

Additional objects and advantages of the invention will be readily apparent from the following description of a device constructed in accordance with the invention, and with reference to the accompanying drawings thereof, wherein:

FIGURE 1 is a side view of the pneumatic separating apparatus with slide doors and chutes adjacent the discharge apertures in the side wall omitted for the purpose of clarity;

FIGURE 2 is a top plan view of the apparatus;

FIGURE 3 is a fragmentary top view showing the arrangement of grooves in the porous deck of the separator trough;

FIGURE 4 is a fragmentary side view of the separator showing visual control windows and details in the structural arrangement of sliding doors and discharge chutes on a side of the trough;

FIGURE 5 is a fragmentary sectional view taken along the line 5—5 of FIGURE 4 and showing the channel at the side of the trough which connects a groove with a discharge chute;

FIGURE 6 is a sectional view of the apparatus taken along the line 6—6 of FIGURE 7;

FIGURE 7 is a sectional view taken along the line 7—7 of FIGURE 6;

FIGURE 8 is a fragmentary top plan view of a part of a modified form of porous deck showing the arrangement of grooves on the top and bottom sides of the deck;

FIGURE 9 is a sectionaal view taken along the line 9—9 of FIGURE 8; and,

FIGURE 10 is an enlarged fragmentary sectional view showing details of the mounting means of the apparatus.

Referring particularly to the drawings, the pneumatic separating apparatus includes a wind box or air chest 20 movably mounted on any supporting structure by resilient means such as strips 21 and 22 of Bakelite or the like. The strips are resiliently flexible and are rectangular in form with a longitudinal dimension corresponding to the width of the wind box, although the strips may be shorter in length. If desired, a pair of shorter co-planar strips may be used in place of each longer strip 21 or 22 such that four strips are provided. Anchoring means for the strips comprise pedestals 23 and 24, respectively, which are equal in length to the strips. The pedestals are provided with base portions 25 and 26, respectively, which may be bolted or otherwise fastened to a floor or other supporting structure. The pedestals have grooves 25a and 26a in their top surfaces directed downwardly at an angle inclined to the vertical and adapted to receive the lower longitudinal edges of the strips. The pedestals and grooves are arranged so that the strips 21 and 22 supported therein are parallel with one another and in a particular angle of inclination such that the planes defined by the strips will be perpendicular to the direction of vibration to which the apparatus is adapted to be subjected, and which vibration is usually directed at an angle thirty degrees upward from the horizontal. The strip 21 is secured to pedestal 23 against lateral displacement by means of bolts or pins 27 which extend through alinged apertures in the pedestal and strip. The strip 22 is similarly secured to the pedestal 24 by bolts or pins 28.

The upper edge portion of strip 21 is received in a downwardly opening longitudinal groove 29 of a bracket 30 which is welded or otherwise secured to the external surface of the rear wall 31 of the wind box and adjacent the lower edge thereof. In addition, strip 21 is secured to the bracket 30 against lateral displacement by bolts or pins 32 which extend through aligned apertures in the strip and the flange.

The upper edge portion of the strip 22 is received in a downwardly opening longitudinal groove 33 of a bracket 34a attached transversely across the bottom wall 34 of the wind box. The strip 22 is secured to bracket 34a by bolts or pins which extend through aligned apertures in the strip and flange.

The wind box in addition to the rear wall 31 and bottom wall 34 includes side walls 36 and 37 and a top wall 38 in the form of a porous table or deck over which ore or other intermixed materials to be separated may be deposited. The deck is supported by a frame 39 having transverse members 39a fastened to longitudinal side members 40a and 40b. The side members 40a and 40b are welded or otherwise secured throughout their length to the side walls 36 and 37 respectively, of the wind box.

The bottom wall of the wind box is provided with an opening having a surrounding flange 41 to which a flexible air duct 42 is connected. The other end of the air duct is connected to the discharge or outlet 43 of a blower 44. The blower delivers air under relatively low pressure to the wind box and includes a rotary fan, not shown, driven by a motor 45 and a drive belt 46 mounted on pulleys attached to the shafts of the motor and fan. The motor 45 and a blower 44 are supported on the floor or other supporting surface by suitable bases 47 and 48, respectively. When the blower is operated, air escapes from the wind box through the permeable deck and if ore or intermixed material is deposited on the deck, the air will pass through the material and cause it to form a fluid layer whose individual particles are suspended in movable relationship to one another in the upwardly flowing air.

A pair of vertically spaced horizontal vibrator shafts 50 and 51 are rotatably journalled in the sides 36 and 37 of the wind box. A pair of weights 52 and 53 are rigidly attached to the shaft 50 and spaced equi-distantly from the respective ends of the shaft. The centers of gravity of the weights are displaced from the longitudinal axis of the shaft so that rotation of the shaft results in vibration of the shaft supporting structure. Shaft 51 is similarly provided with weights 54 and 55.

The vibrator shafts are rotated by a drive means comprising a motor 60 and a drive belt 61 frictionally engaged with a pulley 62 on the motor shaft 63 and a pulley 64 on the vibrator shaft 50. Intermeshing gears 65 and 66 on the shafts 50 and 51, respectively cause the shaft 51 to rotate simultaneously with the shaft 50 and at the same speed. The vibrator shafts and the weights thereon are so arranged that the vibration imparted to the wind box is substantially linear and in the direction of the length of the deck but at an upward angle of approximately 30° relative to the longitudinal surface of the porous deck. The intensity of vibration involves accelerations of the deck of approximately 6 times gravity, and the frequency is of the order of 4000 to 6000 cycles per minute so that this acceleration is obtained with amplitudes of only a few thousandths of an inch. With the vibration of small magnitude, the frequency is necessarily of such high order to provide an adequate conveyance of the ore blanket or intermixed materials over the deck. The low amplitude high frequency stroke yields decided advantages in the concentration and separation of materials of close specific gravity differences particularly so that material subjected to the vibrations will remain close to the bed surface and the heavier materials will gravitate more readily to the bottom of the material.

The heights of the resilient strips or supports 21 and 22 are preselected to provide a particular inclination of the porous deck which is determined by such factors as the nature of the ore or intermixed materials and the desired flow rate for such materials. If desired, of course, the supporting structure on which the pedestals 23 and 24 are secured may itself be inclined to the horizontal to provide the desired inclination of the porous deck. The deck may be level, or tilted either up or down for the purpose of retarding or increasing the flow rate of the blanket of materials as may be desired.

The deck 38 is, in effect, the bottom or bed of a trough, the sides of which are extensions of the sides of the wind-box. The trough is provided with an inclined feed or chute portion 67 sloping toward the upper end of the deck so that the ore or mixed materials may be fed to the trough at its raised end as from a hopper or other feed device. The materials pass over the deck and because of the vibration and air passing through the deck will be floated over the deck as a loose blanket of particles toward the open lower discharge end of the trough.

The deck may be made of permeable or porous material, such as natural pumice, stone composition, or materials of like nature which have sufficient porosity to have the desired permeability to air. The surface of the deck is provided with a number of grooves 80 arranged in a symmetrical herringbone or chevron-like pattern wherein the grooves are outwardly divergent toward the sides of the deck and the lower discharge end thereof. The grooves in each V-shaped or chevron pair are preferably uniform in depth, although the grooves may be shallow near the apex of the V and increase in depth toward the sides of the shaker deck. Each pair may vary widely in depth from other pairs but preferably the grooves near the raised feed-end of the trough are shallower than the others. All grooves except the quite shallow grooves at the upper portion of the deck are preferably greater in depth than width. The spacing between the pairs may also be varied widely to accommodate different characters of ore but for any one deck the pairs are preferably equally spaced. Grooves about ¼ to ½ the thickness of the airflow deck, such as ½ inch in a 1 inch deck, and spaced ½ inch to 1 inch apart as measured longitudinally of the deck have proved very satisfactory in operation.

The edge 81 of each groove, which is the edge nearest the upper or feed-end of the deck, is beveled so that particles gravitating to the surface of the deck and falling into a groove are guided into a circular movement as a result of their movement over the beveled edge and the forces acting upon them from the directed vibration of the deck. Because of the circular movement imparted to the particles they are more likely to remain trapped in the grooves and less likely to be churned up and mixed again with the surrounding body of sand, gravel, or other materials of lighter specific gravity. If desired, a flange or lip, not shown, may be provided on the trailing edge of each groove, i.e., the edge nearest the discharge end of the separator, to further assist in the entrapment of particles in the grooves. Such a flange or lip should extend partially over the bottom of the groove but should not extend above the surface of the deck.

Since air is fed at constant pressure to the entire bottom surface of the porous deck, the rate of flow is greater through the grooves where the resistance of the path is less than it is through the "lands" between the grooves. If for any given ore to be separated, this rate of air flow in the grooves proves to be excessive, such that the ore or the finer precious metal particles are likely to be blown out of the grooves and not collect as certainly as they should, the air flow up through the grooves can be reduced in amount as desired by partial "blinding" of the porous material directly below the grooves which reduces the permeability of the deck. Such "blinding" of the underside of the porous deck may be accomplished by paint, removable adhesive tape, rubber cement, or any other suitable impervious coating which may be applied thereto. Since it is desirable for thorough separation of particles of different densities, that the layer or blanket of materials in moving over the deck pass through zones or columns of air which flow upwardly at different rates to subject the materials to a "pulsating effect," this "blinding" is partial rather than complete.

The porous deck is cut away at the lateral extremities of the grooves, as at 82, to cause the lower or downstream ends of the grooves to communicate with apertures 85 in the side walls of the trough. In an operation for separating gold or precious metals from ore, the heavy fine particles of metal are led along the grooves through the apertures and collected in a concentrate bin or other suitable collecting apparatus. To guide the metal particles and facilitate the discharge of the metal from the grooves, chutes 86 may be mounted on the side walls just below the discharge apertures. In addition, sliding doors 87 are slidably mounted to the side walls of the trough to slide between the parallel longitudinal slide guides 88 and 89 disposed above and below the apertures, respectively, whereby a slide door may be used to close an aperture in the side wall of the trough whenever closure is desirable, as when replacing the collector containers below the discharge chutes. The doors may also be used to partially close the apertures so as to control the outflow of concentrates from the grooves.

In order to provide means for removing the lighter particles of the material or gangue fed onto the deck, the separator includes a vacuum scoop 90 disposed above the surface of the deck. The lower leading edge 91 of the scoop extends transversely across the deck and is disposed at the proper height to cause the larger sized light granular materials which have no heavy minerals or gold ore mixed therewith to pass into the scoop and be drawn from the deck. In normal operation, the deck is inclined downwardly relative to the horizontal and the scoop is disposed substantially horizontally so that the suction does not need to lift the materials but merely draws them along a horizontal path. While any suitable suction means may be employed with the scoop, the means illustrated includes a pipe 92 connecting the scoop 90 with a centrifugal separator 93. The centrifugal separator is connected to a suction fan 94 by means of a conduit 95 communicating with the centrifugal separator at the top thereof. The fan is adapted to pull air and the gangue through the scoop 90 and pipe 92 into the centrifugal separator. The gangue drawn into the centrifugal separator is discharged through its discharge duct 96.

The granular materials below the lower or downstream edge of the deck which may still contain some mixture of gold or ore values will, of course, fall off the lower edge of the deck where they may be recirculated back by any suitable means to the upstream feed end of the deck if desired.

A plurality of small windows 97 are also built into the side wall of the trough for visual or automatic scanning of the ore blanket. The windows may be used to aid adjustment of the outflow of concentrates from the grooves as by the adjustment of the sliding doors to vary the size of the discharge apertures. The windows may also be used to determine proper positioning of the vacuum scoop above the surface of the shaker deck, or the positioning of other types of conventional skimming devices such as conventional cutter bars which could be used with the apparatus if desired. The windows are placed in the side walls adjacent the groove extremities at the sides of the porous deck and each is of a size exceeding the transverse sectional area of the adjacent groove so as to extend above the top surface of the deck. A few windows are desirable at the upstream entrance end of the deck so as to permit study of the manner in which separation is taking place. This arrangement, of course, is useful only when there is a color distinction between the gangue and the valuable particles, or any other visible difference such as fluorescence, which may be readily discernible and of which advantage can be taken. It is apparent that the adjustment of control devices, if determined to be necessary as a result of visual examination through the windows, may be performed manually or may be done automatically with suitable apparatus, such as apparatus incorporating the use of a light beam and photo cells adapted to sense visible differences between the gangue and the valuable mineral.

As previously stated, it is particulraly desirable for the separation of particles that the intensity of air flow be varied longitudinally along the deck in order that the rising air column appear to the layer of materials moving longitudinally over the deck as a pulsating column. A modified form of porous shaker table which increases the pulsation effect is illustrated in FIGURES 8 and 9. The increase in variation of air flow intensity along the deck is accomplished by providing the bottom side of the deck with grooves 98 and 99. Since more air is admitted through the thin portions of the porous deck than in thicker portions, the variations in thinness of the deck provides variations in the velocity of air passing through these portions. For some ores it may be desirable to have pulsation grooves cut under the "lands" or spaces between the grooves in the top side of the deck and have the bottom of the deck below the topside riffle grooves completely blinded, so that air velocity will be greater between the topside grooves than up through them. The depth of such bottom grooves may be adjusted to give any desired variation in air velocity for a given type and grind of ore. Illustratively, and not by way of limitation, the pulsation grooves such as grooves 99 in the bottom side of porous deck 38a illustrated in FIGURE 9 may like the grooves in the upper side, be ¼ to ½ of the deck thickness in depth to cause 33% to 100% greater air velocity in the area above the pulsation grooves in the bottom side of the deck. For some ores, bottom grooves such as the grooves 98 may also be formed in the bottom of the porous deck directly beneath the top grooves to provide a desirable variation in the character of pulsation.

The apparatus described above is useful for the separation of intermixed materials of different specific gravities, the particles of which may vary widely in size, and is particularly useful in the separating of minerals from the country rock or gangue in which the mineral occurs. While its operations have largely been described as relating to the separation of such minerals from ores, they are obviously applicable in the separation of other intermixed materials of different specific gravities.

In the dry extraction of metal values from ore, as is conventionally practiced, the ore is crushed until an economically practicable percentage of the mineral value is freed from the gangue. The crushed material is then screened to eliminate large size particles and is then fed to the separator to separate the desired minerals from the gangue. In the use of the separator described herein, the screened ore is fed at a uniform rate to the separator trough. Air feeding from the porous deck passes through the ore to cause it to become a fluid blanket of particles. The vibration of the deck moves this fluid blanket of material over the deck. The pulsating effect of the zones of different velocities of the air to the longitudinally moving material facilitates the settling out of heavier metal particles in the chevron-like grooves in the top surface of the deck whereupon they are led along the grooves to discharge apertures in the side of the deck where they may be collected.

It will be seen that the grooving of the underside of the porous deck provides a means for varying the velocity of air or intensity of air flow along the deck so as to represent a pulsating column of air to materials passing over the deck and facilitate the gravitating of particles of high specific gravity by breaking up loose agglomerations of particles.

It will further be seen that the "blinding" of the underside of the porous deck beneath the grooves in its top surface provides a means for limiting the flow of air up through the grooved portions of the deck to prevent the churning up and blowing of particles from the grooves as would hinder their collection.

It will further be seen that the beveling of the leading edge of the grooves in the top surface of the deck in conjunction with a vibration of the deck which is in the direction of inclination of the deck but at an angle substantially 30 degrees upward therefrom results in the imparting of a circular movement to particles falling into the grooves and increases the likelihood of their entrapment within the grooves.

It will further be seen that the concentrating apparatus described herein which includes an inclined porous deck, having chevron-like grooves in its upper surface and pulsation grooves in its undersurface, together with means for imparting linear vibration as described herein, and a vacuum scoop for skimming the lighter materials from a blanket of ore deposited on the deck, provides a novel apparatus for the extraction of mineral and metal values from gangue material at unprecedented rates per unit of investment.

It will further be seen that the provision of grooves in the deck which have downwardly and downstream divergent portions and which open at opposite sides of the deck permits an increased rate of processing of the materials since the separated concentrates or minerals may be discharged at a plurality of longitudinally spaced points along each side of the deck thus preventing overloading of the grooves with such concentrates which then causes additional concentrates to move with the gangue over the downstream end of the deck.

It will also be seen that the provision of visual control windows in the sides of the separator trough facilitates the determining of necessary adjustments in the apparatus, such as the positioning of the vacuum scoop and the inclination of the porous deck.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A material separator for separating intermixed materials of different specific gravities comprising a porous deck having sides and an end portion for receiving deposits of the intermixed materials; and means for forcing a gaseous medium upwardly through said deck, the deck having in its upper surface a plurality of spaced grooves which extend outwardly and away from said end portion to open at the sides of the deck, grooves adjacent said end portion being of shallower depth than grooves remote from said end portion.

2. A material separator for separating intermixed materials of different specific gravities comprising a porous deck having sides and an end portion for receiving deposits of the intermixed materials; means for forcing a gaseous medium upwardly through said deck, the deck having in its upper surface an arrangement of grooves which extend outwardly and away from said end portion to open at the sides of the deck; and means for vibrating the porous deck, grooves adjacent said end portion being of shallower depth than grooves remote from said end portion.

3. A material separator for separating intermixed materials of different specific gravities comprising a porous deck having sides and an end portion for receiving deposits of the intermixed materials; means for forcing a gaseous medium upwardly through said deck, the deck having in its upper surface an arrangement of spaced grooves which extend outwardly to and open at the sides of the deck, grooves adjacent said end portion being of shallower depth than grooves remote from said end portion, said grooves remote from said end portion being greater in depth than width; means for vibrating the porous deck; and means in addition to the grooves in the upper surface of the deck for varying the intensity of air flow through the deck at particular portions thereof.

4. A material separator for separating intermixed materials of different specific gravities comprising a porous deck having sides and an end portion for receiving deposits of the intermixed materials; means for forcing a gaseous medium upwardly through said deck, the deck having in its upper surface an arrangement of spaced grooves which extend outwardly to open at the sides of the deck, grooves adjacent said end portion being shallower than the grooves remote from said end portion, grooves remote from said end portion being greater in depth than in width; means for vibrating the porous deck; and impervious means attached to the bottom surface of the porous deck directly beneath the grooves thereof for partially blinding said deck to the passage of air.

5. An apparatus for separating intermixed materials of different specific gravities comprising a porous deck having sides and an end portion for receiving deposits of the intermixed materials; and means for forcing a gaseous medium upwardly through the deck, said deck having in its upper surface a plurality of spaced grooves which extend outwardly and away from said end portion to open at the sides of the deck, grooves adjacent said end portion being shallower than the grooves remote from said end portion, grooves remote from said end portion being greater in depth than in width, the edge of each groove nearest said end portion being beveled.

6. An apparatus for separating intermixed materials of different specific gravities comprising an inclined longitudinal trough adapted to receive the intermixed materials at its upper end, said trough being provided with sides having discharge apertures and a permeable deck having a chevron-like arrangement of grooves in its upper surface which are divergent outwardly to the sides of the trough and in the direction of inclination of the trough, grooves adjacent said upper end being shallower than grooves remote from said upper end, grooves remote from said upper end being greater in depth than in width, selected ones of said grooves communicating with said discharge apertures; means for forcing a gaseous medium upwardly through said permeable deck; and means for vibrating the trough.

7. An apparatus for separating intermixed materials of different specific gravities comprising an inclined longitudinal trough adapted to receive the intermixed materials at its upper end, said trough being provided with sides having discharge apertures and a permeable deck having a chevron-like arrangement of grooves in its upper surface which are divergent outwardly to the sides of the trough and in the direction of inclination of the trough, grooves adjacent said upper end being shallower than grooves remote from said upper end, grooves remote from said upper end being greater in depth than in width, selected ones of said grooves communicating with said discharge apertures; means for forcing a gaseous medium upwardly through said permeable deck; means for vibrating the trough; and window means forming part of the sides of said trough and extending below the upper surface of said deck for viewing materials collected in said grooves and observing the flow of materials over said permeable deck.

8. An apparatus for separating intermixed materials of different specific gravities comprising an inclined longitudinal trough adapted to receive the intermixed materials at its upper end, said trough being provided with sides having discharge apertures and a permeable deck having a chevron-like arrangement of grooves in its upper surface which are divergent outwardly to the sides of the trough and in the direction of inclination of the trough, grooves adjacent said end portion being shallower than grooves remote from said end portion, grooves remote from the end portion being greater in depth than in width, selected ones of said grooves communicating with said discharge apertures; means for forcing a gaseous medium upwardly through said permeable deck; means for vibrating the trough; and control means on the sides of the trough for varying the sizes of the discharge apertures.

9. The apparatus recited in claim 8 wherein the control mean for varying the size of the discharge apertures comprises doors slidably mounted on the sides of the trough, each of said doors being positioned to selectively open or close a discharge aperture as desired.

10. A gas permeable deck for use in apparatus for separating divided materials of different specific gravities, said deck being rectangular and having longitudinally spaced grooves in its upper surface which extends outwardly to open at the sides of the deck, some of said grooves adjacent one end of the deck having a greater depth than width, said grooves adjacent said one end being greater in depth than grooves remote from said one end, the edge of each of said grooves being beveled upwardly and away from said one end.

11. A deck formed of air permeable material having sides and an end portion and adapted for use with a material separator apparatus, said deck having a chevron-like arrangement of grooves in its upper surface extending away from said end portion and diverging outwardly to open at the sides of the deck, grooves adjacent said end portion being shallower than grooves remote from said end portion, grooves remote from said end portion being greater in depth than in width, said deck having grooves formed in its undersurface extending away from said end portion and diverging outwardly toward the sides of the deck.

12. An apparatus for separating intermixed materials of different specific gravities comprising an inclined porous deck adapted to receive deposits of said intermixed materials on its upper surface; means for causing the conveyance of said materials over the deck in the direction of inclination of the deck; means for extracting the particles of higher specific gravity from said deposits as they are conveyed over the deck; and vacuum scoop means for removing a top layer of the conveyed materials supported on said deck and being conveyed thereby, said vacuum scoop means including a substantially horizontally disposed suction conduit provided with a substantially horizontally disposed scoop at one end, the mouth of the scoop being positioned over the upper surface of the deck to scoop said top layer of materials from the deposits from lower layers of material resting on the deck and conveyed over the deck.

References Cited in the file of this patent

UNITED STATES PATENTS

| | | |
|---|---|---|
| 995,449 | Franz | June 20, 1911 |
| 1,579,660 | Reilly | Apr. 6, 1926 |
| 1,817,298 | Davis | Aug. 4, 1931 |
| 2,275,849 | Fraser | Mar. 10, 1942 |
| 2,291,044 | Kennedy | July 28, 1942 |
| 2,810,481 | Lofquist et al. | Oct. 22, 1957 |

UNITED STATES PATENT OFFICE
CERTIFICATE OF CORRECTION

Patent No. 3,108,950                          October 29, 1963

Eugene F. Buckley

It is hereby certified that error appears in the above numbered patent requiring correction and that the said Letters Patent should read as corrected below.

Column 7, lines 54 through 57, for "to open at the sides of the deck; and means for vibrating the porous deck, grooves adjacent said end portion being of shallower depth than grooves remote from said end portion." read -- to open at the sides of the deck, grooves adjacent said end portion being of shallower depth than grooves remote from said end portion; and means for vibrating the porous deck. --.

Signed and sealed this 16th day of June 1964.

(SEAL)
Attest:

ERNEST W. SWIDER
Attesting Officer

EDWARD J. BRENNER
Commissioner of Patents